July 26, 1949.  E. O. SCHWEITZER, JR  2,477,424
SYNCHRONOUS ELECTRIC MOTOR CONSTRUCTION
Filed Nov. 23, 1946  2 Sheets-Sheet 1
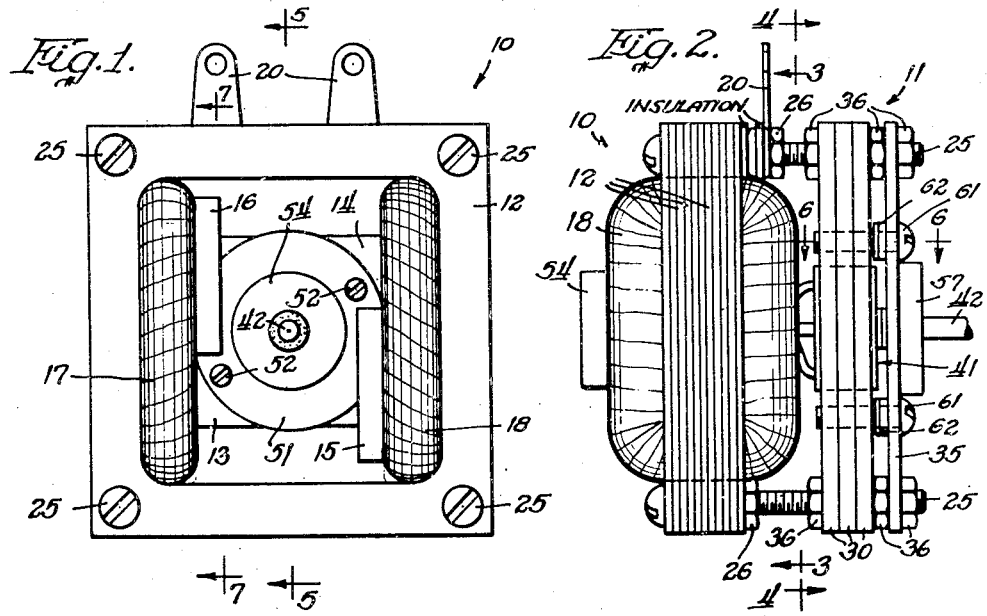
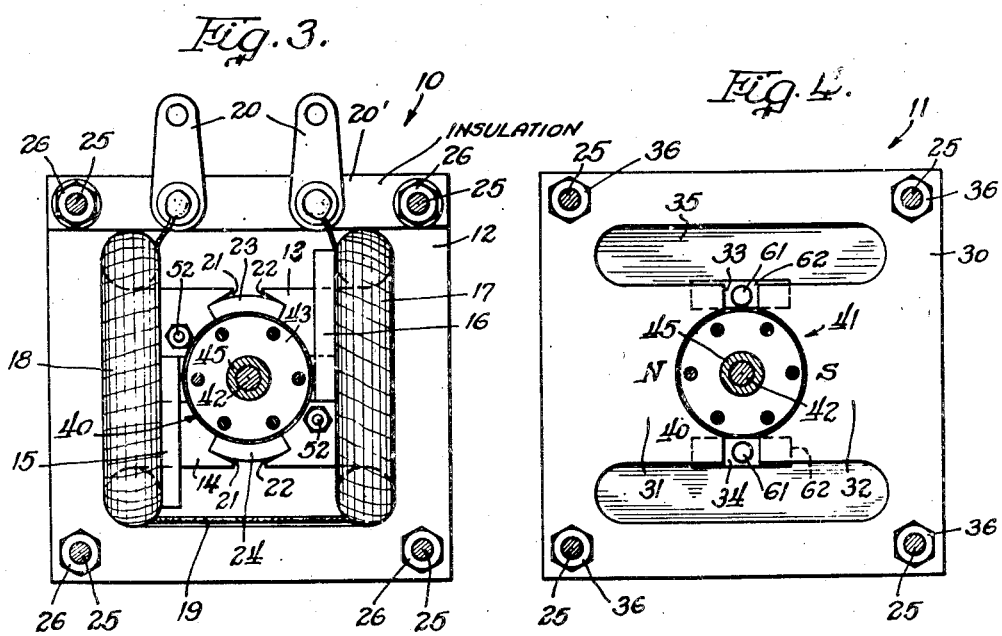
Inventor:
Edmund O. Schweitzer, Jr.
By Brown, Jackson, Boettcher & Dienner
Atty's.

July 26, 1949.  E. O. SCHWEITZER, JR  2,477,424
SYNCHRONOUS ELECTRIC MOTOR CONSTRUCTION
Filed Nov. 23, 1946  2 Sheets-Sheet 2
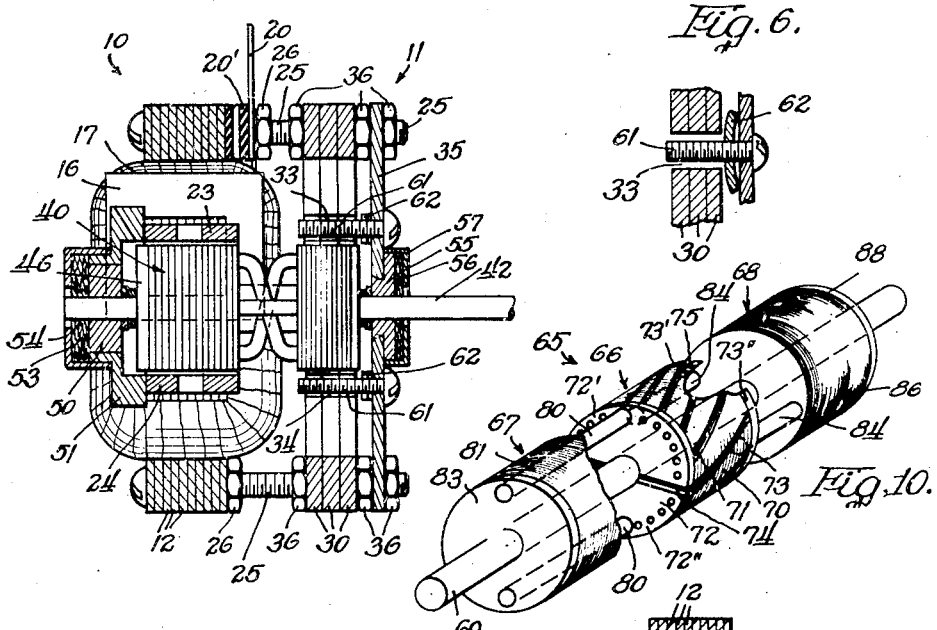
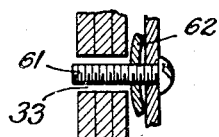
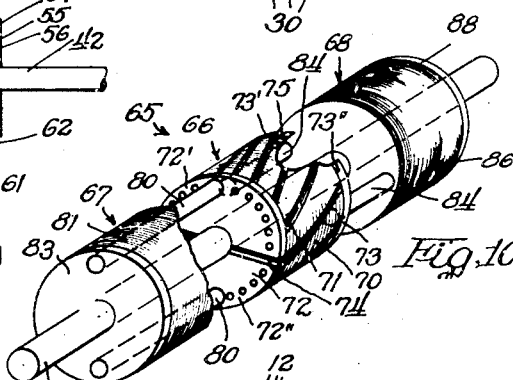
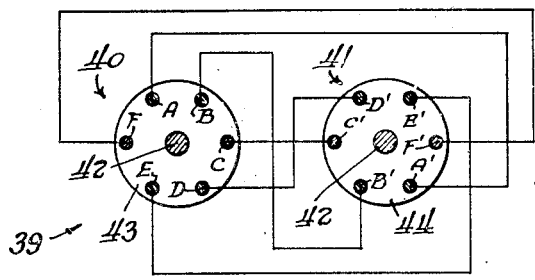
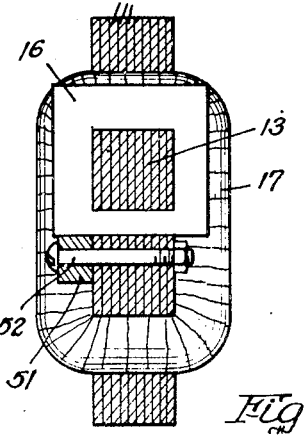
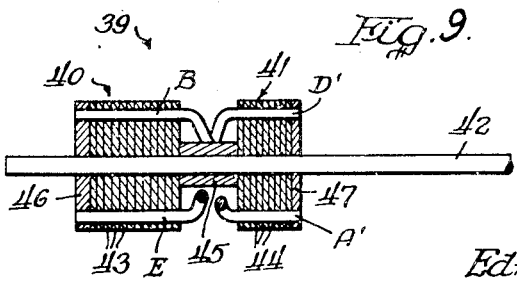
Inventor:
Edmund O. Schweitzer, Jr.
By Brown, Jackson, Boettcher & Dienner
Attys.

Patented July 26, 1949

2,477,424

UNITED STATES PATENT OFFICE 2,477,424

SYNCHRONOUS ELECTRIC MOTOR CONSTRUCTION

Edmund O. Schweitzer, Jr., Northbrook, Ill.

Application November 23, 1946, Serial No. 712,007

11 Claims. (Cl. 172—278)

My invention relates, generally, to dynamo-electric devices, and it has particular relation to synchronously operating electric motors.

This invention constitutes an improvement over the construction disclosed in my co-pending application Serial No. 578,485, filed February 17, 1945.

Among the objects of this invention are: To increase the torque output of the synchronous motor construction disclosed in my aforesaid co-pending application; to provide a six phase rotor section for each of the alternating and unidirectional fields or fluxes; to employ a stator construction of such shape as to use the magnetic materials forming the same in an economical and efficient manner; and to provide for adjusting the phase position of the rotor by varying the amount of the unidirectional flux co-pending with the same.

Other objects of my invention will, in part, be obvious and in part appear hereinafter.

My invention is disclosed in the embodiment thereof shown in the accompanying drawings and it comprises the features of construction, combination of elements, and arrangement of parts which will be exemplified in a construction hereinafter set forth, and the scope of the application of which will be indicated in the appended claims.

For a more complete understanding of the nature and scope of my invention reference may be had to the following detailed description, taken together with the accompanying drawings, in which;

Figure 1 is a view, in an end elevation, of the alternating flux end of my improved motor construction;

Figure 2 is a view, in side elevation, of the motor shown in Figure 1;

Figure 3 is a detail sectional view taken along the line 3—3 of Figure 2 and looking in the direction indicated by the arrows;

Figure 4 is a detail sectional view taken along the line 4—4 of Figure 2 and looking in the direction of the arrows;

Figure 5 is a detail sectional view taken along the line 5—5 of Figure 1;

Figure 6 is a detail sectional view taken along the line 6—6 of Figure 2;

Figure 7 is a detail sectional view taken along the line 7—7 of Figure 1;

Figure 8 illustrates, diagrammatically, the manner in which the phases of the two sections of the rotor are cross connected, the left and right rotor sections being shown as viewed in Figures 3 and 4 respectively;

Figure 9 is a longitudinal sectional view of the rotor with conductors B—E and D'—A' in elevation; and Figure 10 is a perspective view of an alternate rotor construction that can be employed.

Referring now particularly to Figures 1, 2 and 6 of the drawings, it will be noted that the reference character 10 designates, generally, the driving or alternating flux motor portion, and that the reference character 11 designates, generally, the synchronous or unidirectional flux motor portion. These two motor portions cooperate, the first to provide the required driving torque, and the second, to insure that synchronous speed is maintained.

The alternating flux motor portion 10 comprises a stator which includes laminations 12 of low retentivity magnetic material. It is generally rectangular in shape, and it has inwardly projecting poles 13 and 14. This particular configuration makes maximum use of the magnetic material making up the laminations 12.

In order to make the motor self-starting, shading rings 15 and 16 are provided around portions of the poles 13 and 14, as illustrated in Figure 3, to effect the necessary shifting of the magnetic flux. Energizing windings 17 and 18 are provided on the poles 13 and 14. They may be connected in series by a conductor 19. The ends of the windings 17 and 18 may be connected to terminals 20 which may be secured in any suitable manner to a terminal strip 20' of insulation.

With a view to increasing the amount of flux threading the shading rings 15 and 16, the ends of the poles 13 and 14 are notched, as indicated at 21 and 22. The magnetic shunts 23 and 24 are located in the notches 21 and 22 to increase the amount of magnetic flux linked by the shading rings 15 and 16.

The generally rectangular stator laminations 12 may be secured together in any suitable manner. For example, elongated bolts 25 may be employed, one at each corner. Nuts 26 may be threaded on the bolts 25, as indicated, for clamping the laminations 12 securely together.

The synchronous or unidirectional flux motor portion 11 may be formed of relatively thick laminations 30 of relatively high retentivity magnetic material. The laminations 30 preferably have the same outer dimensions as the laminations 12, so as to facilitate alignment as indicated on the bolts 25.

In addition this configuration permits a maximum use of the material involved. The laminations 30 are shaped to provide inwardly extending poles 31 and 32 which are magnetized to provide the polarites indicated at N and S. Air gaps 33 and 34 are provided between the adjacent end portions of the poles 31 and 32. As will appear hereinafter, provision is made for shunting a portion of the unidirectional flux through these air gaps.

The laminations 30, as indicated, are mounted on the bolts 25 and are securely held. An end plate 35 of nonmagnetic material, such as brass, is also mounted on the bolts 25. The laminations 30 and end plate 35 are secured in position on the bolts 25 by suitable nuts 36, as illustrated more clearly in Figures 2 and 5 of the drawings.

The rotor for the stators, just described, is illustrated, generally, at 39 and the details of construction thereof are shown more clearly in Figures 5 and 9 of the drawings.

It will be observed that the rotor 39 comprises two sections which are indicated, generally, at 40 and 41. The section 40 is arranged to co-operate with the alternating flux generated by the energizing windings 17 and 18, while the rotor section 41 is arranged to co-operate with the unidirectional flux between the poles 31 and 32. The rotor sections 40 and 41 are mounted for conjoint rotation on a common shaft 42. The rotor section 40 comprises laminations 43 of low retentivity magnetic material. Rotor section 41 is similarly constructed with laminations 44. It will be noted that the stack of laminations of 43 is longer than the stack of laminations 44. These proportions may be varied, as desired, and, if desired, may be of the same length. They are spaced apart on the shaft 42 by a spacer 45.

The rotor section 40 is provided with a polyphase winding which comprises six conductors of copper or the like that are indicated at A, B, C, D, E, F. The rotor section 41 is similarly provided with a polyphase winding comprising six conductors A', B', C', D', E', F'. These conductors are located within the periphery of the respective rotor sections in the manner that the bars of a squirrel cage rotor are located. They are insulated by any suitable means from the laminations 43 and 44. For example, they may be provided with a coating of insulating lacquer. The outer ends of the conductors making up the polyphase winding on rotor section 40 may be interconnected by a disc 46 of a good conducting material, such as copper. Likewise the ends of the conductors making up the polyhpase winding on rotor section 41 may be interconnected by a disc 47 of copper.

Now it is desired that the phase relationship of the current flow in the polyphase winding on the rotor section 41 be the reverse of that in the polyphase winding on the rotor section 40. The reason for this is set forth in detail in my co-pending application referred to above.

In order to provide for this reverse phase relationship in the current flow, certain of the conductors making up the polyphase windings on the rotor sections 40 and 41 are cross connected rather than being directly interconnected. To this end, as illustrated in Figure 8, conductor C is connected directly to conductor C' and conductor F is connected directly to conductor F'. It will be observed that these conductors are in alignment on the rotor sections 40 and 41. However, it will be observed that conductor A, for example, in rotor section 40 is mechanically displaced 120° away from the position of conductor A' in rotor section 41. The same relationship exists for conductors B and B', D and D', and E and E'. These conductors are cross connected, as illustrated in Figure 8, thereby providing the desired reverse phase relationship.

At its left-hand end, as illustrated in Figure 5, the shaft 42 is journaled in a bearing 50 that is carried by a bearing support 51, which may be secured, as by screws 52, Figure 1, to the poles 13 and 14. Bearing packing 53, carrying a suitable lubricant, may be mounted adjacent to bearing 50 and held in place by a cap 54. The bearing 50, bearing support 51, and cap 54 are formed of nonmagnetic material, such as brass.

The other end of shaft 42 may be supported in a bearing 55 that is carried by the plate 35. Bearing packing 56 may be provided within a cap 57.

As indicated hereinbefore, it is desirable to vary the unidirectional flux which co-operates with the current in the polyphase winding on the rotor section 41. For this purpose magnetic shunts, in the form of screws 61 of magnetic material, are mounted on plate 36 and arranged to project into the air gaps 33 and 34.

The screws 61 are threaded into spring washers 62, Figure 6, the resiliency of which serves to hold the same in place in any position to which they may be moved. When the magnetic shunts or screws 61 are located in the position shown in Figure 5, the unidirectional field is weakened and the rotor 39 advances in phase from 5° to 10° with respect to its position when they are removed from the air gaps 33 and 34. However, the rotor 39 continues to run at the same synchronous speed.

In the construction shown in the drawings and described hereinbefore, since two poles 13 and 14 are provided between which there is alternating flux, and assuming that the windings 17 and 18 are energized with alternating current at a frequency of 60 cycles, the rotor 39 will tend to run at a speed of 3600 R. P. M. However, because of the cross connection between the polyphase windings on the rotor sections 40 and 41 and because of the two poles 31 and 32 providing the unidirectional flux, the rotor 39 will rotate at a synchronous speed of 1800 R. P. M. At this speed, which is one-half of the full theoretical synchronous speed of the rotor 39, the frequency of the current induced in the polyphase windings is 30 cycles per second.

The reactance of the rotor section 41 is changed when the air gap between it and the poles 31 and 32 is varied. When the length of the air gap is increased, the reactance of the rotor section 41 is decreased. This improves the running and synchronous torque characteristics of the motor within limits.

Obviously more than two poles, such as four poles similar to poles 13 and 14 and 31 and 32, can be used. In such case the rotor speed would be 900 R. P. M.

In Figure 10 there is illustrated, generally, at 65 an alternate form of rotor construction which can be employed in practicing my invention. This rotor construction 65 comprises a central section, shown generally at 66, and end sections, shown generally at 67 and 68. The rotor sections 66, 67 and 68 are mounted for conjoint rotation on a shaft 69.

The central rotor section 66 comprises a core 70 of suitable laminated magnetic material having rotor bars 71 located in the periphery thereof and in skewed relation thereon as is conventional for assisting in the starting of squirrel cage induction motors. The rotor bars 71 are interconnected at their ends by end plates 72 and 73 of copper or the like, which also is conventional in this type of rotor construction.

Now in accordance with my invention, I slot the end plates 72 and 73 as indicated at 74 and 75, the slots being located at right angles to each other. It will be observed that the slots 74 and 75 divide the end plates 72 and 73 into two distinct equal sections 72'—72" and 73'—73".

A single phase winding comprising a pair of rod-like conductors 80 is provided for the rotor section 67. The conductors 80 in effect constitute an extension of the polyphase winding formed by the bars 71 on the central rotor section 66. They extend through the core of the rotor section 67 and are interconnected at one end thereof by an end plate 83.

In a similar manner a single phase winding comprising rod-like conductors 84 is provided for the rotor section 68. The conductors 84 are connected to the sections 73' and 73" of the end plates 73 and extend through the core 86 of the rotor section 68 and are interconnected at the end thereof by an end plate 88.

The central rotor section 66 is arranged to be energized by an alternating current flux, such as that provided by the motor portion 10 of the construction previously described and shown in Figures 1, 2, 3, and 5 of the drawings. Each of the end sections 67 and 68 is arranged to cooperate with a synchronous or unidirectional flux motor portion, such as the portion 11 shown in Figures 2, 4 and 5 of the drawings. Since only a single phase winding is employed on each of the rotor sections 67 and 68, the cost of construction thereof is reduced over that for the polyphase winding construction which is illustrated in Figures 8 and 9.

It will be understood that the rotor construction 65 will function in a satisfactory manner if one of the end sections 67 or 68 is omitted. When only the rotor sections 66 and 68, for example, are employed, the rotor construction thus provided can be employed in lieu of the rotor construction 39, shown in Figures 5 and 9 of the drawings, for cooperation with the motor sections 10 and 11 where the same external dimensions and arrangement of the rotor sections are employed. In this embodiment of the invention the end plate 72 would be unslotted and thus would be a single plate.

Since certain further changes can be made in the foregoing constructions and different embodiments of the invention can be made without departing from the spirit and scope thereof, it is intended that all matters shown in the accompanying drawings and described hereinbefore shall be interpreted as illustrative and not in a limiting sense.

I claim as my invention:

1. A synchronous alternating current dynamoelectric device comprising, in combination, a rotor having two sections, a six phase winding on each section cross connected so that the phase rotation of one winding is the reverse of that of the other winding, and a stator disposed in cooperative relation to each rotor section, one stator and a single phase winding thereon being arranged and adapted to provide single phase alternating flux acting along an axis fixed in space to drive the rotor and the other being arranged and adapted to provide unidirectional flux acting along an axis fixed in space for cooperating with the flux generated by the current in the winding of the other rotor section to cause the rotor to operate at a speed corresponding to the frequency of the rotor currents and the number of rotor poles.

2. A synchronous alternating current dynamoelectric device comprising, in combination, a rotor having two sections, a six phase winding on each section, two diametrically opposite phases of each winding being interconnected, the remaining four phases of each winding being cross connected so that the phase rotation of one winding is the reverse of that of the other winding, and a stator disposed in cooperative relation to each rotor section, one stator and a single phase winding thereon being arranged and adapted to provide single phase alternating flux acting along an axis fixed in space to drive the rotor, and the other being arranged and adapted to provide unidirectional flux acting along an axis fixed in space for cooperating with the flux generated by the current in the winding of the other rotor section to cause the rotor to operate at a speed corresponding to the frequency of the rotor currents and the number of rotor poles.

3. A synchronous alternating current dynamoelectric device comprising, in combination, a generally rectangular low retentivity stator having inwardly projecting poles, single phase winding means on said poles adapted to be energized from a single phase alternating current source to provide single phase alternating flux between said poles acting along an axis fixed in space, a generally rectangular high retentivity stator aligned with said low retentivity stator and having inwardly projecting poles permanently magnetized to provide unidirectional flux therebetween, a rotor individual to each stator, means mounting said rotors for conjoint rotation between the respective poles of said stators, and a polyphase winding on each rotor, said polyphase windings being cross connected so that the phase rotation of one is the reverse of that of the other winding.

4. The invention, as set forth in claim 3, wherein each polyphase winding comprises six phases.

5. The invention, as set forth in claim 3, wherein each polyphase winding comprises six phases, four of which are cross connected.

6. A synchronous alternating current dynamoelectric device comprising, in combination, a rotor having two sections, a polyphase winding on each rotor, said polyphase windings being cross connected so the phase rotation of one is the reverse of that of the other, a stator disposed in cooperative relation to each rotor section, one stator and a single phase winding thereon being arranged and adapted to provide single phase alternating flux acting along an axis fixed in space to drive the rotor and the other being arranged and adapted to provide unidirectional flux acting along an axis fixed in space for cooperating with the flux generated by the current in the winding of the other rotor section to cause the rotor to operate at a speed corresponding to the frequency of the rotor currents and the number of rotor poles, and means for varying the unidirectional flux that cooperates with the rotor current to vary the phase position of said rotor.

7. A synchronous alternating current dynamoelectric device comprising, in combination, a rotor having two sections, a six phase winding on each section cross connected so that the phase rotation of one winding is the reverse of that of the other winding, a stator disposed in cooperative relation to each rotor section, one stator and a single phase winding thereon being arranged and adapted to provide single phase alternating flux acting along an axis fixed in space to drive the rotor and the other being arranged and adapted to provide unidirectional flux acting along an axis fixed in space for cooperating with the flux generated by the current in the winding of the other other rotor section to cause the rotor to operate at a speed corresponding to the frequency of the rotor currents and the number of rotor poles, and means for varying the unidirectional flux that cooperates with the rotor current to vary the phase position of said rotor.

8. A synchronous alternating current dynamo-electric device comprising, in combination, a generally rectangular low retentivity stator having inwardly projecting poles, single phase winding means on said poles adapted to be energized from a single phase alternating current source to provide single phase alternating flux between said poles acting along an axis fixed in space, a generally rectangular high retentivity stator aligned with said low retentivity stator and having inwardly projecting poles permanently magnetized to provide unidirectional flux therebetween, a rotor individual to each stator, means mounting said rotors for conjoint rotation between the respective poles of said stators, a polyphase winding on each rotor, said polyphase windings being cross connected so that the phase rotation of one is the reverse of that of the other winding, and means for varying the unidirectional flux that cooperates with the rotor individual thereto to vary its phase position and thereby the phase position of the other rotor.

9. A synchronous alternating current dynamo-electric device comprising, in combination, a pair of rotor sections disposed in tandem for conjoint rotation, a plurality of conductors forming a polyphase winding on one rotor section, plates at the ends of said one rotor section interconnecting said conductors, one of said end plates being slotted along a diameter thereof to provide two electrically distinct plate sections, a pair of conductors forming a single phase winding on the other rotor section and individually connected to said plate sections, a plate at the outside end of said other rotor section interconnecting the ends of said pair of conductors, and a stator disposed in cooperative relation to each rotor section, one stator being arranged and adapted to provide alternating flux for energizing said one rotor section, and the other being arranged and adapted to provide unidirectional flux for cooperating with the flux generated by the current in said single phase winding to cause the rotor to operate at a speed corresponding to the frequency of the rotor current and number of rotor poles.

10. The invention, as set forth in claim 9, wherein a third rotor section is provided for conjoint rotation with the pair of rotor sections and is located at the end of the one rotor section opposite the end where the other rotor section is located, the other end plate of said one rotor section being slotted transversely with respect to the slot in the one end plate to form two distinct plate sections, a single phase winding formed by a pair of conductors located on said third rotor section and individually connected to said plate sections, a plate at the outside end of said third rotor section interconnecting the ends of said pair of conductors, and a stator providing unidirectional flux for cooperating with the flux generated by the current in said single phase winding.

11. A synchronous alternating current dynamo-electric device, comprising, in combination, a rotor having two sections, a six phase winding on each section cross connected so that the phase rotation of one winding is the reverse of that of the other winding, a stator disposed in cooperative relation to each rotor section, one stator being arranged and adapted to provide alternating flux to drive the rotor and the other being arranged and adapted to provide unidirectional flux for cooperating with the flux generated by the current in the winding of the other rotor section to cause the rotor to operate at a speed corresponding to the frequency of the rotor currents and the number of rotor poles, and means for varying the unidirectional flux that cooperates with the rotor current to vary the phase position of said rotor comprising magnetic means reciprocable with respect to said other stator to shunt a portion of the flux around the rotor section associated therewith.

EDMUND O. SCHWEITZER, Jr.

REFERENCES CITED

The following references are of record in the file of this patent:

UNITED STATES PATENTS

| Number | Name | Date |
|---|---|---|
| 587,340 | Steinmetz | Aug. 3, 1897 |
| 781,968 | Sachs | Feb. 7, 1905 |
| 1,617,092 | Yamamoto et al. | Feb. 5, 1927 |
| 1,628,464 | Hobart | May 10, 1927 |
| 1,723,906 | Alexanderson | Aug. 6, 1929 |
| 2,039,322 | Lell | May 5, 1936 |
| 2,061,983 | Rossman | Nov. 24, 1936 |
| 2,098,646 | Lewis | Nov. 9, 1937 |
| 2,105,666 | Lilja | Jan. 18, 1938 |
| 2,444,077 | Weathers | June 29, 1948 |

FOREIGN PATENTS

| Number | Country | Date |
|---|---|---|
| 471,113 | Great Britain | Aug. 23, 1937 |

OTHER REFERENCES

Theory and Calculation of Electrical Apparatus by Steinmetz, first edition, 1917, pages 58 and 71 to 78.